(12) United States Patent
Furuyama

(10) Patent No.: US 7,645,412 B2
(45) Date of Patent: Jan. 12, 2010

(54) SEALING DEVICE

(75) Inventor: Hideyuki Furuyama, Fukushima (JP)

(73) Assignee: NOK Corporation, Kanagawa (JP)

( * ) Notice: Subject to any disclaimer, the term of this patent is extended or adjusted under 35 U.S.C. 154(b) by 301 days.

(21) Appl. No.: 11/711,105

(22) Filed: Feb. 27, 2007

(65) Prior Publication Data

US 2007/0152369 A1 Jul. 5, 2007

Related U.S. Application Data

(63) Continuation of application No. 10/504,326, filed as application No. PCT/JP03/01007 on Jan. 31, 2003, now abandoned.

(30) Foreign Application Priority Data

Feb. 28, 2002 (JP) .............................. 2002-053742

(51) Int. Cl.
 *B29C 41/46* (2006.01)
 *F16J 15/52* (2006.01)
 *B23B 27/06* (2006.01)
(52) U.S. Cl. .......................... 264/319; 277/636; 407/65
(58) Field of Classification Search .................. 264/319; 277/636; 407/65
 See application file for complete search history.

(56) References Cited

U.S. PATENT DOCUMENTS

| | | | |
|---|---|---|---|
| 3,739,662 A * | 6/1973 | Windelman et al. ........ 76/107.1 |
| 4,084,826 A | 4/1978 | Vossieck et al. ............. 277/134 |
| 4,094,519 A | 6/1978 | Heyn et al. | |
| 4,964,647 A | 10/1990 | Stephan ....................... 277/560 |
| 5,511,886 A | 4/1996 | Sink ............................ 384/486 |
| 5,678,829 A | 10/1997 | Kalsi et al. ................... 277/559 |
| 5,759,466 A | 6/1998 | Onuma et al. ................ 264/161 |
| 6,276,691 B1 | 8/2001 | Nishigaki et al. | |

FOREIGN PATENT DOCUMENTS

| | | |
|---|---|---|
| EP | 0939257 A2 | 9/1999 |
| GB | 1219272 | 1/1971 |
| JP | 52-76560 | 6/1977 |
| JP | 01-321110 | 12/1989 |
| JP | 02-274410 | 11/1990 |
| JP | 06-254745 | 9/1994 |
| JP | 06-259124 | 9/1994 |
| JP | 09-042463 | 2/1997 |
| JP | 11-311338 | 9/1999 |
| JP | 2000-065216 | 3/2000 |
| JP | 2000-310338 | 11/2000 |

OTHER PUBLICATIONS

Korean Office Action dated Jun. 26, 2008.
Korean Office Action dated Aug. 25, 2008.
Japanese Office Action dated Sep. 9, 2008.

* cited by examiner

*Primary Examiner*—Joseph S. Del Sole
*Assistant Examiner*—Lorraine Rios
(74) *Attorney, Agent, or Firm*—Jacobson Holman PLLC

(57) ABSTRACT

A sliding portion between a seal lip (7) and the circumference of a shaft (3) is made of a sliding face (10) so that the facial pressure at the initial action time can be lowered to suppress the proceeding of the wear of the seal lip (7) thereby to elongate the lifetime of a sealing device (1). Moreover, screw ridges (12) are formed from an atmospheric side slope (11) to a sliding face (10) so that satisfactory sealing properties can be exhibited initially and endurably for a long time.

4 Claims, 8 Drawing Sheets

SEALING DEVICE

This is a continuation of U.S. patent application Ser. No. 10/504,326 filed Aug. 24, 2004, now abandoned which was a nationalization of PCT/JP03/01007 filed Jan. 31, 2003 and published in Japanese.

TECHNICAL FIELD

The present invention relates to a sealing device such as an oil seal to be used in the shaft sealing portions of various devices and, more particularly, to a structure having screw ridges on the atmospheric side slope of a seal lip.

BACKGROUND ART

A sealing device of this kind has been known in the related art and disclosed in JP-A-9-42463, for example, as shown in FIG. 7.

This sealing device 100 is mounted in the annular clearance between a housing 102 and a shaft 103, i.e., two members to be assembled to rotate relative to each other, so that it seals up that annular clearance thereby to prevent a sealed object such as oil from leaking out.

The sealing device 100 is constructed to include: an annular seal body 105 to be fitted on the inner circumference of a shaft bore formed in the housing 102; and a reinforcing ring 104 to be fitted in the seal body 105 for giving it rigidity.

The seal body 105 is provided with a seal lip 107, which extends radially inward from an atmospheric side A toward an sealed object side O. Moreover, the seal lip 107 is provided at its leading end portion with a lip leading end 110 having a wedge-shaped section. This lip leading end 110 has a predetermined interference with the circumference of the shaft 103 so that it is slidably brought into sealing contact with the circumference of the shaft 103 by its elastic restoring force thereby to prevent the sealed object from leaking out.

On an atmospheric side slope 111 of the seal lip 107, on the other hand, there are formed screw ridges 112. Each of these screw ridges 112 is shaped by combining a bilge-shaped portion 112a, which is larger in height and width toward the axially intermediate portion, and a straight portion 102b having substantially constant height and width. The straight portion 102b merges into the end portion of the bilge-shaped portion 112a on the side of the lip leading end 110 and extends to the lip leading end 110.

By thus providing the screw ridge 112 in which the bilge-shaped portion 112a and the straight portion 112b are continuously combined with the atmospheric side slope 111 of the seal lip 107, the initial sealing properties are retained by the straight portion 112b, and the deterioration in the sealing properties of the seal lip 107 while the wear is proceeding is prevented by the bilge-shaped portion 112a.

However, the case of the related art thus far described has the following problems.

Generally, the sealing device made of elastomer is prepared by pouring elastic material into a molding die and by vulcanizing and shaping it. In order to form the screw ridges on the seal lip, therefore, recesses conforming to the screw shape have to be formed in advance in the molding die.

In order to obtain the screw ridge 112 having the aforementioned two different shapes combined, two steps shown in FIGS. 8A and 8B are required for manufacturing the molding die. At first, a cutter 114 having a straight blade edge is pushed onto a molding die 116, as shown in FIG. 8A, to form a recess (depression) 117 corresponding to the straight portion. Next, as shown in FIG. 8B a cutter 115 having an arcuate blade edge is pushed onto the recess 117 to form a recess 118 corresponding to the bilge-shaped portion. Thus, the sealing device of the conventional construction invites complexity and complicatedness in the processing step of the molding die 116 and is demanded for a high working precision.

On the other hand, the lip leading end 110 of the seal lip 107 of the related art is a sharp edge. Therefore, the fastening pressure (or the facial pressure) at the initial action time is raised to cause a problem that the proceeding of the wear of the lip leading end 110 is accelerated.

In the wedge-shaped lip of the related art, moreover, it is necessary that the unnecessary portion of the lip leading end is cut off with a knife after the vulcanized and shaped seal body was taken out from the molding die 116. This necessity complicates the working process of the sealing device itself and raises the cost. Another problem is that this knife-cutting step easily causes dispersion in the cutting position.

The invention has been conceived in view of the background thus far described, and has an object to provide a sealing device which has an easy manufacturing and a slow proceeding of wear so that satisfactory sealing properties can be exhibited initially and endurably for a long time.

DISCLOSURE OF THE INVENTION

In order to achieve the above-specified object, according to the invention, there is provided a sealing device for sealing an annular clearance between two members assembled to rotate relative to each other, the sealing device comprising a seal lip for sliding on the circumference of one of the two members, wherein the seal lip includes: a sliding face extending along the circumference; an atmospheric side slope inclined to enlarge the clearance gradually between the slope and the circumference from the atmospheric side end edge of the sliding face; and a screw ridge formed from said atmospheric side slope to said sliding face.

The sliding portion between the seal lip and the member circumference is made of a face (or a sliding face) so that the facial pressure at the initial action time can be lowered unlike the wedge-shaped lip of the related art, to retard the proceeding of the wear of the sliding portion of the seal lip thereby to elongate the lifetime of the sealing device.

Moreover, the screw ridge is formed to extend from the atmospheric side slope to the sliding face so that it makes proper contacts with the member circumference both at the long action time (or when the wear proceeds) and at the initial action time. Specifically, at the initial action time, a screw portion arranged on the sliding face makes contacts with the member circumference to exhibit the screw pump effect thereby to retain the initial sealing properties. In case the wear of the screw portion proceeds, on the other hand, a screw portion arranged on the atmospheric side slope makes contacts with the member circumference to keep/improve the screw pump effect thereby to prevent the deterioration of the sealing properties when the wear proceeds. Therefore, the satisfactory sealing properties can be exhibited initially and endurably for a long time.

In case the screw ridge having two kinds of screw portions combined for the initial action time and the wear proceeding time are to be manufactured, the molding die has to be worked in the related art by using two kinds of working jigs (or cutters) corresponding to the individual screw portions. This is partly because the joint portion of the two kinds of screw portions is discontinuous and partly because the internal angle of the joint portion is made reentrant (i.e., an angle larger than 180 degrees). This is further because it is generally extremely difficult to manufacture such a cutter as can work the recess corresponding to that reentrant angle by a single cutting operation.

In the invention, therefore, this problem is solved by adopting a construction, in which the internal angle of the joint between the screw portion for the initial action time and the screw portion for the wear proceeding time is made salient.

For example, the screw actions of two stages for the initial action time and the wear proceeding time are realized at first by arranging the screw ridge across the two faces, i.e., the sliding face and the atmospheric side slope and then by making the screw portion arranged on the sliding face dominant at the initial action time and the screw portion arranged on the atmospheric side slope dominant at the wear proceeding time.

Here, the atmospheric side slope is inclined to make the clearance gradually wider between the atmospheric side end edge of the sliding face and the member circumference, so that the internal angle between the sliding face and the atmospheric side slope is made salient. Then, the internal angle of the joint between the screw portion for the initial action time and the screw portion for the wear proceeding time can also be made salient.

If the internal angle of the joint of the two screw portions is salient although discontinuous, it is relatively easy to manufacture the blade edge of the cutter in a manner to correspond to such screw shape. If the cutter matching that screw shape is used on the basis of the aforementioned construction, therefore, it is possible to simplify and facilitate the process of manufacturing the molding die of the sealing device.

Moreover, it is preferable that the screw ridge is formed along the atmospheric side slope and to have such a shape that its end portion on the side of the sliding face is cut off along the sliding face.

The recess corresponding to that screw shape can be manufactured by a single cutting operation using a cutter cut off at the end portion of its blade edge. Here, the shape of this cutoff portion may be either a taper straight one or a rounded curve one. In the case of the straight cutoff shape, however, the manufacturing of the cutter itself is easy. In case the cutter is more or less offset in the axial direction when pushed onto the molding die, moreover, the dispersion in the sealing performance due to the working precision can be suppressed without hardly affecting the screw height (from the sliding face) of the cutoff portions of the screw ridge adversely.

In addition to the aforementioned construction of the sealing device, moreover, it is preferable that second screw ridge is formed only on the sliding face.

At the initial action time, therefore, the sliding face, the screw ridge and the second screw ridge make contacts with the member circumference so that the screw pump effect by the screw ridges can be enhanced to improve the initial sealing properties better.

BEST MODE FOR CARRYING OUT THE INVENTION

Preferred embodiments of the invention will be described illustratively in detail with reference to the accompanying drawings. However, the sizes, materials, shapes and relative arrangements of the components described in the embodiments are not intended to limit the scope of the invention to the described ones so long as they are not specifically described so.

First Embodiment

A sealing device according to a first embodiment of the invention will be described with reference to FIG. 1 and FIG. 2.

Figure 1:
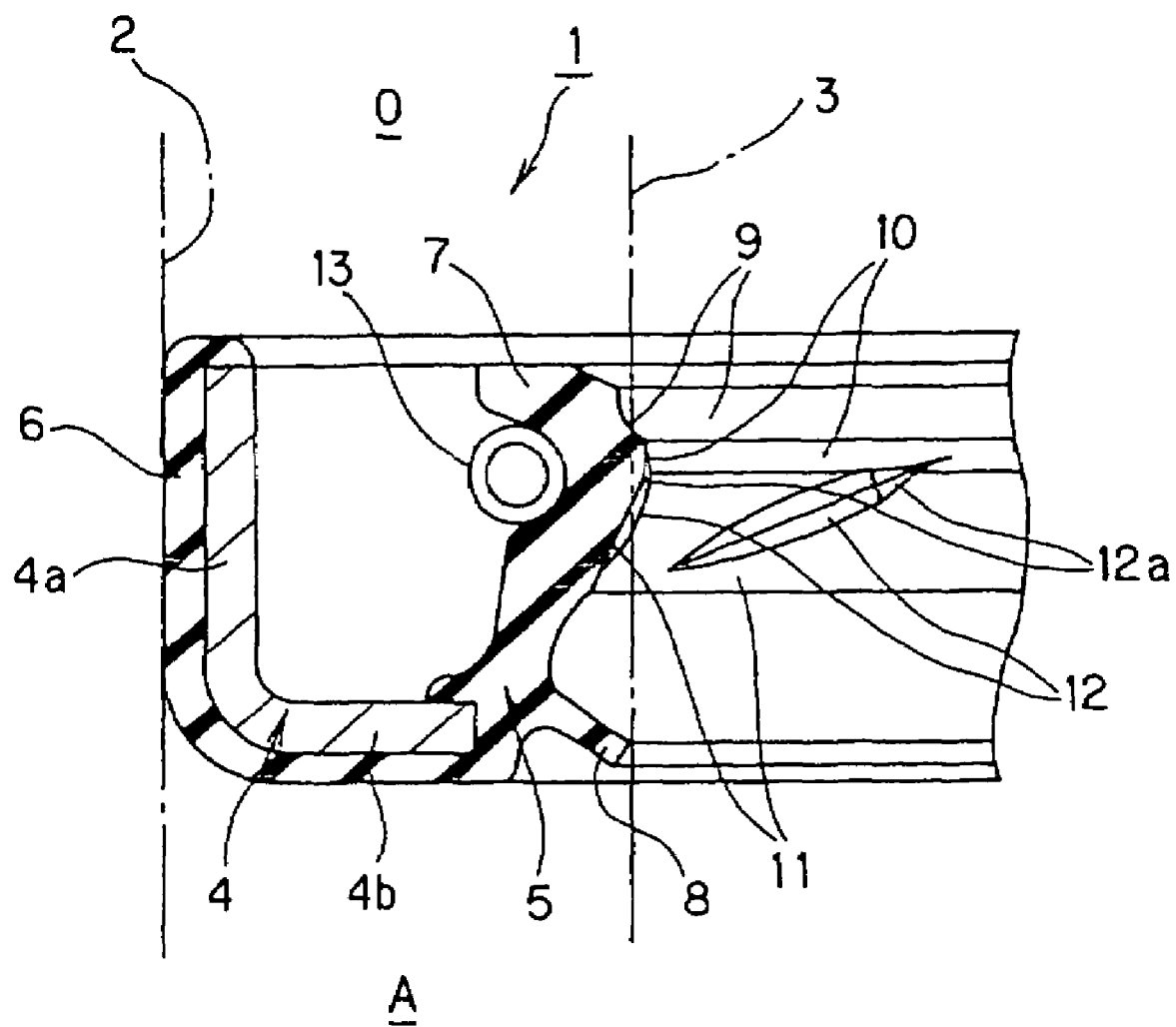
FIG. 1 is a schematic section of a sealing device according to a first embodiment of the invention.
Figure 2:
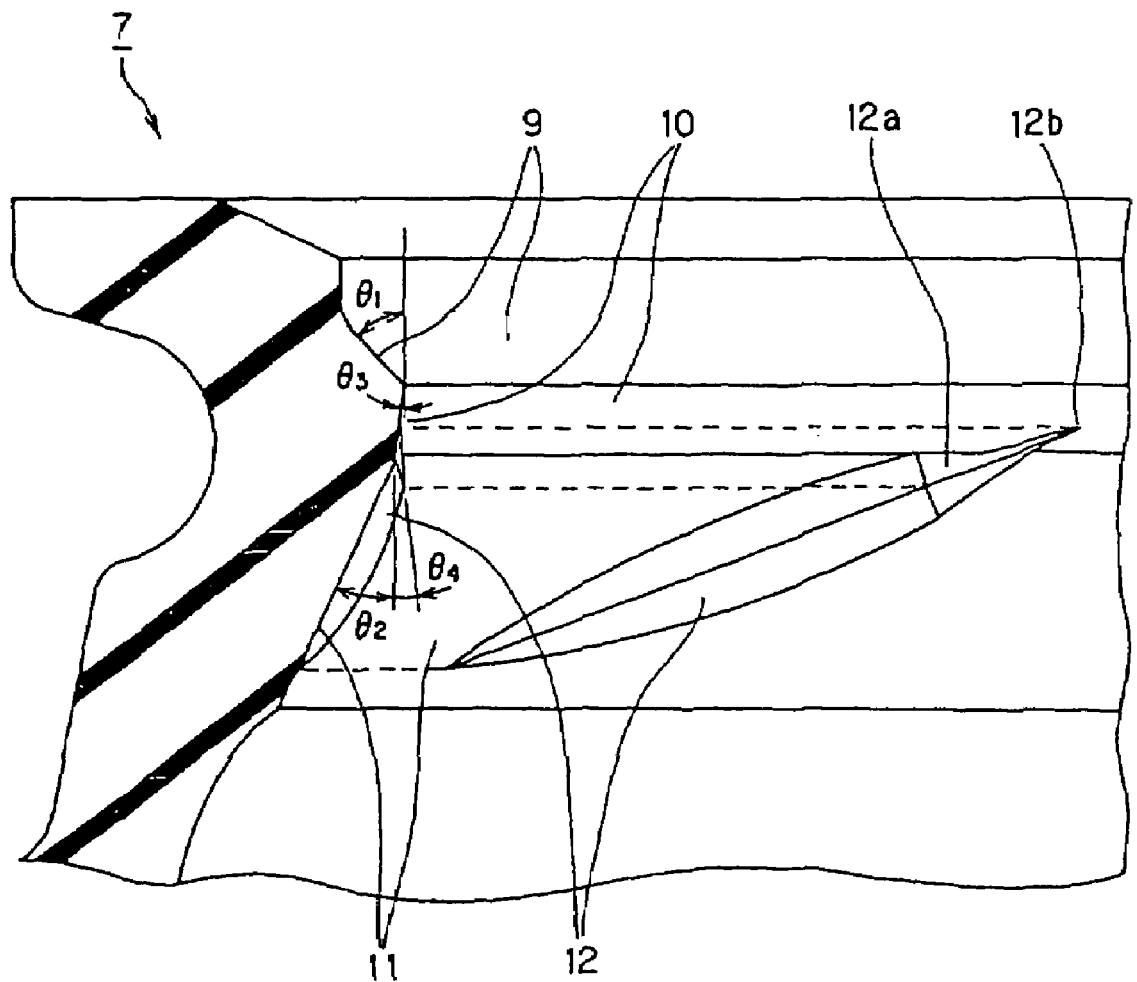
FIG. 2 is a section of an essential portion of the sealing device according to the same embodiment.

FIG. 1 is a schematic section of a sealing device 1 of the embodiment, and FIG. 2 is a section of an essential portion of the sealing device 1.

This sealing device 1 is mounted in an annular clearance between a housing 2 and a shaft 3 acting as two members, which are assembled to rotate concentrically of and relative to each other, so that it may seal up the annular clearance thereby to prevent a sealed object such as oil from leaking out.

The sealing device 1 is constructed to include: an annular seal body 5 to be fitted on the inner circumference of a shaft bore formed in the housing 2; and a reinforcing ring 4 to be fitted in the seal body 5 for giving it rigidity.

The reinforcing ring 4 is an annular member of a metal having an L-shaped section and includes: a cylindrical portion 4a disposed along the inner circumference of the shaft bore; and an inward flange portion 4b extending radially inward from the end portion of the cylindrical portion 4a on an atmospheric side A.

The seal body 5 is made of elastomer, which is integrally baked and fixed over from the outer circumference of the cylindrical portion 4a of the reinforcing ring 4 to the end face of the inward flange portion 4b on the atmospheric side A and to the end face of the same on a sealed object side O.

In the seal body 5, an outer circumference seal portion 6 fixed on the outer circumference of the cylindrical portion 4a of the reinforcing ring 4 has a predetermined interference with the inner circumference of the shaft bore of the housing 2. The outer circumference seal portion 6 is firmly fixed on the inner circumference of the shaft bore while receiving a fitting rigidity from the cylindrical portion 4a of the reinforcing ring 4 thereby to prevent the sealed object from leaking out from the inner circumference of the shaft bore. Here, the outer circumference seal portion 6 is not an essential component but may be replaced by a construction (of a metal fitting type), in which the cylindrical portion 4a of the reinforcing ring 4 is fitted directly on the inner circumference of the shaft bore.

At the seal body 5 on the side of the shaft 3, on the other hand, there are formed: a seal lip 7 which extends radially inward toward the sealed object side O from the inner end of the inward flange portion 4b of the reinforcing ring 4; and a dust lip 8 which extends radially inward oppositely toward the atmospheric side A.

The dust lip 8 has such a plate-shaped section that its leading end may come into sealing contact slidably with the circumference of the shaft 3. This sealing contact prevents dust from invading from the atmospheric side A.

The seal lip 7 includes: a sealed object side slope 9 confronting the sealed object side O; an atmospheric side slope 11 confronting the atmospheric side A; and a sliding face 10 arranged between those sealed object side slope 9 and atmospheric side slope 11.

The sealed object side slope 9 of the seal lip 7 is inclined to enlarge the clearance from the circumference of the shaft 3 gradually from the end edge of the sliding face 10 on the sealed object side O toward the sealed object side O. It is preferred that an angle of slope $\theta_1$ (FIG. 2) of the sealed object side slope 9 with respect to the circumference of the shaft 3 is set within a range of 45 degrees±10 degrees.

On the other hand, the atmospheric side slope 11 of the seal lip 7 is inclined to enlarge the clearance from the circumference of the shaft 3 gradually from the end edge of the sliding face 10 on the atmospheric side A toward the atmospheric side A. It is preferred that an angle of slope $\theta_2$ of the atmospheric side slope 11 with respect to the circumference of the shaft 3 is set within a range of 25 degrees±10 degrees.

Between the sealed object side slope 9 and the atmospheric side slope 11, moreover, there is formed the sliding face 10 along the circumference of the shaft 3. Specifically, the leading end of the seal lip 7 is so continuously formed, from the sealed object side O to the atmospheric side A, of the sealed object side slope 9, the sliding face 10 and the atmospheric side slope 11, that it constructs a flat type sliding portion having a generally trapezoidal section.

Here, it is preferred that an angle of slope $\theta_3$ of the sliding face 10 with respect to the circumference of the shaft 3 is set within a range of 10 degrees±10 degrees. Specifically, it is preferred that the sliding face 10 is so inclined although substantially along the circumference of the shaft 3 that the clearance from the circumference of the shaft 3 is slightly enlarged gradually toward the atmospheric side A. However, it is necessary that the relation of $\theta_3 < \theta_2$ be satisfied.

In this embodiment, moreover, the seal lip 7 is provided with screw ridges (or pumping ridges or pumping ribs) 12 from the atmospheric side slope 11 to the sliding face 10.

Each screw ridge 12 has a basic shape of a bilge-shaped screw formed along the atmospheric side slope 11, but its end portion (i.e., a cutoff portion 12a) on the side of the sliding face 10 is formed into such a shape that it is cut off along the sliding face 10 (or the circumference of the shaft 3). Moreover, the cutoff portion 12a has a leading end 12b reaching so far as the sliding face 10.

It is preferred that an angle of slope $\theta_4$ of the cutoff portion 12a with respect to the circumference of the shaft 3 is set within a range of 0 degrees to 45 degrees. Specifically, it is preferred that the cutoff portion 12a is formed generally in parallel with the circumference of the shaft 3 or inclined to enlarge the clearance from the circumference of the shaft 3 gradually toward the sealed object side O.

Of the screw ridge 12, therefore, the internal angle of the joint portion between the screw portion (i.e., the bilge-shaped portion) of the screw ridge 12 arranged on the atmospheric side slope 11 and the screw portion (i.e., the cutoff portion 12a) arranged on the sliding face 10 is salient (i.e., an angle smaller than 180 degrees).

The lip leading portion having the aforementioned construction has a predetermined interference with the circumference of the shaft 3, as shown in FIG. 1. When the sealing device 1 is mounted on the shaft 3, therefore, it is so subject to an elastic deformation that the seal lip 7 is radially enlarged.

By the elastic restoring force of the seal lip 7, the sealing device 1 is slidably brought into sealing contact with the circumference of the shaft 3. Here, on the outer circumference side of the seal lip 7, as located just on the back of the sliding face 10, there is mounted a garter spring 13 for giving the lip leading end portion a tensing force to tense it onto the shaft 3.

In the sealing device 1 thus constructed, the sliding face 10 and the cutoff portion 12a of the screw ridge 12 comes at first of the initial action time into contact with the circumference of the shaft 3. By the suction effect of the sliding face 10 and the screw pump effect of the screw ridges 12, therefore, satisfactory sealing properties can be obtained to prevent the sealed object from leaking from the sealed object side O.

As the wear of the screw leading end portion proceeds in the operation for a long term, moreover, the width of contact of the sliding face 10 becomes larger. Accordingly, the bilge-shaped portion of the screw ridge 12 comes into contact with the circumference of the shaft 3 so that the contact width of the screw ridge 12 becomes larger. Here, the "contact width" means the axial width of the contact face with the circumference of the shaft 3.

The screw pump effect by the screw ridge 12 is determined by the ratio between the contact width of the sliding face 10 and the contact width of the screw ridge 12. According to the construction of the embodiment, the contact width of the screw ridge 12 becomes larger as the wear proceeds. Even after the operation for the long term, therefore, the satisfactory sealing properties can be kept without any deterioration.

The screw ridges 12 are thus formed along the atmospheric side slope 11 and the sliding face 10 so that the initial sealing properties can be retained by the cutoff portions 12a. At the same time, the sealing properties can also be prevented from degrading when the wear proceeds, so that the satisfactory sealing properties can be exhibited initially and durably for a long time.

In this embodiment, moreover, the sliding portions of the lip leading end portions are facial (or the sliding face 10) so that the fastening pressure at the initial stage of operation can be made lower than that of the wedge-shaped lip of the related art. As a result, the wear of the lip leading end portions can be retarded to elongate the lifetime of the sealing device 1.

According to the sealing device 1 of this embodiment, moreover, the adoption of the construction thus far described can facilitate the manufacturing of the molding die and the sealing device itself, as will be described in detail.

Generally, the sealing device made of elastomer is prepared by pouring elastic material into a molding die and by vulcanizing and shaping it. In order to form the screw ridges on the seal lip, therefore, it is necessary to form recesses conforming to the screw shape in advance in the molding die.

In the case of the screw ridge having two kinds screw shapes combined, as described in the example of the related art, the recess corresponding to the straight portion and the recess corresponding to the bilge-shaped portion have had to be individually formed by using the different cutters. This is because the joint portion between the straight portion and the bilge-shaped portion is discontinuous and has a reentrant internal angle so that it is extremely difficult to manufacture a cutter capable of working the recess corresponding to the reentrant angle by a single cutting operation.

According to the construction of this embodiment, on the contrary, the sliding face 10 extends along the circumference of the shaft 3, and the screw ridge 12 extends from the atmospheric side slope 11 to the sliding face 10. Therefore, it is possible to make salient the internal angle of the joint portion between the cutoff portion 12a, which is the portion for mainly keeping the initial sealing properties, and the bilge-shaped portion, which is the portion for mainly keeping the sealing properties when the wear proceeds.

The recess corresponding to such screw shape can be formed by the single working operation using the cutter, which is cut off at the end portion of its blade edge. In short, the screw ridges for the actions and effects like those obtained by combining the straight screws and the bilge-shaped screws can be realized more easily.

Figure 3A:
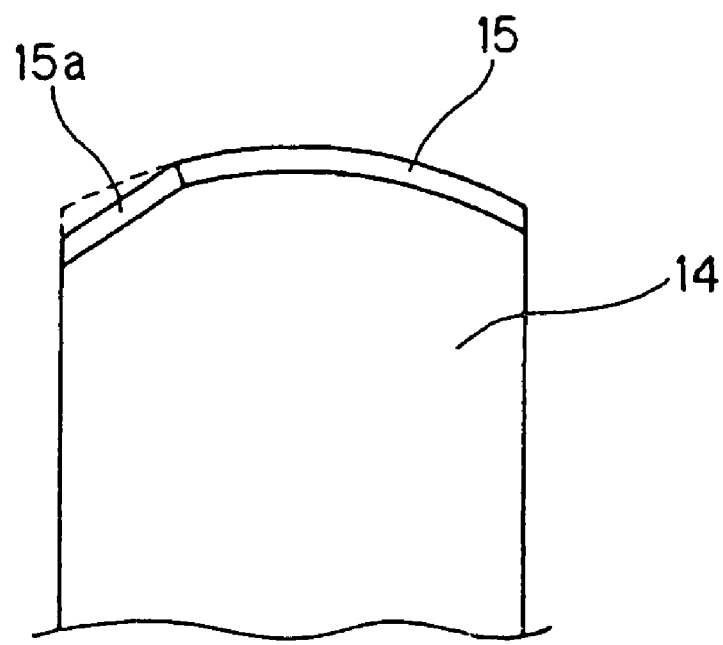
FIGS. 3A and 3B are diagrams showing a cutter for forming a recess corresponding to a screw ridge.
Figure 3B:
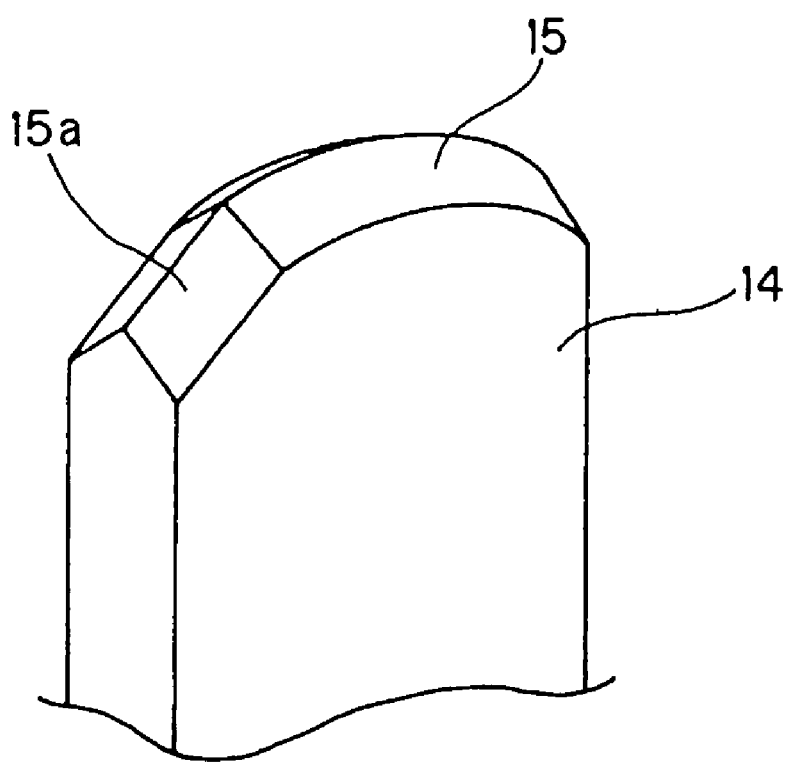
Figure 4:
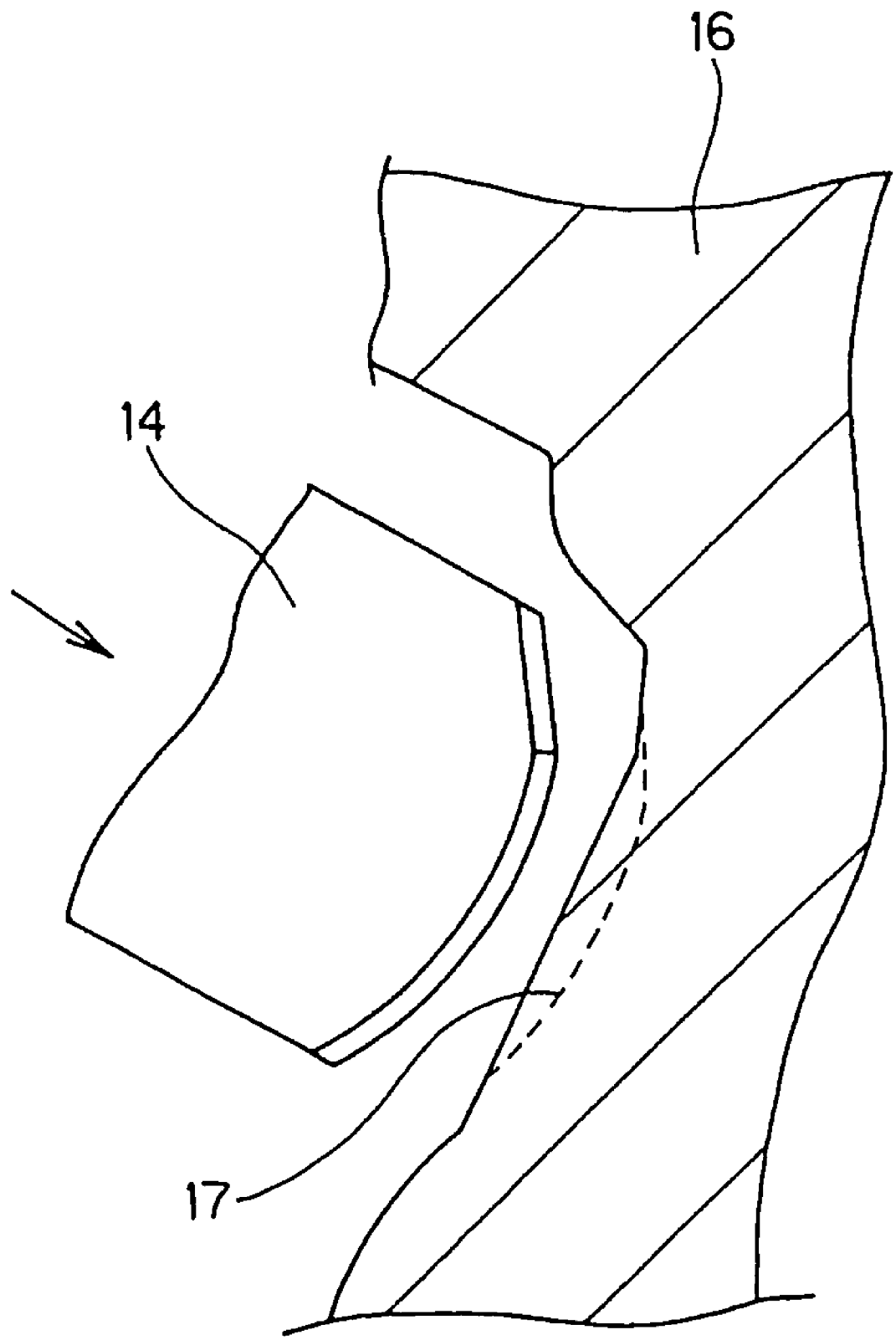
FIG. 4 is a schematic diagram showing the behavior, in which a recess corresponding to the screw ridge is formed in a molding die.

A specific method for manufacturing the molding die will be described with reference to FIGS. 3A and 3B and FIG. 4. Of FIGS. 3A and 3B showing the cutter for forming the recesses corresponding to the screw ridges, FIG. 3A presents a side elevation, and FIG. 3B presents a perspective view. FIG. 4 is an explanatory diagram showing the behavior when the recess corresponding to the screw ridge is formed in the molding die.

As shown in FIGS. 3A and 3B, a cutter 14 to be used in this embodiment is provided with not only an arcuate blade edge 15 corresponding to the bilge-shaped portion but also a cutoff blade edge 15a, which is cut off straight from one end portion of that blade edge 15. The manufacture of such blade edge shape is relatively easy. When the cutter 14 is pushed onto a molding die 16, as shown in FIG. 4, a recess 17 corresponding to the screw shape can be formed by the single working operation.

Thus, according to the construction of this embodiment, the two kinds of screw portions of different shapes can be cut in the molding die by the single operation so that the working process of the molding die can be simplified and facilitated.

Moreover, the screw shape of the portion for retaining the initial sealing properties is cut off straight so that the working operation of the cutter 14 is made easy. In addition, even if the cutter 14 is more or less offset in the axial direction when it is pushed onto the molding die 16, the offset does not adversely affect the screw height (from the sliding face 10) of the cutoff portion 12a of the screw ridge 12 so that the dispersion in the sealing performance due to the working precision can be suppressed.

Moreover, the lip leading end portion is formed by the sliding face 10 so that the knife-cutting step can be eliminated. Therefore, the seal body can be manufactured only by the molding operation so that the working process of the sealing device itself can be simplified and facilitated.

Second Embodiment

Figure 5:
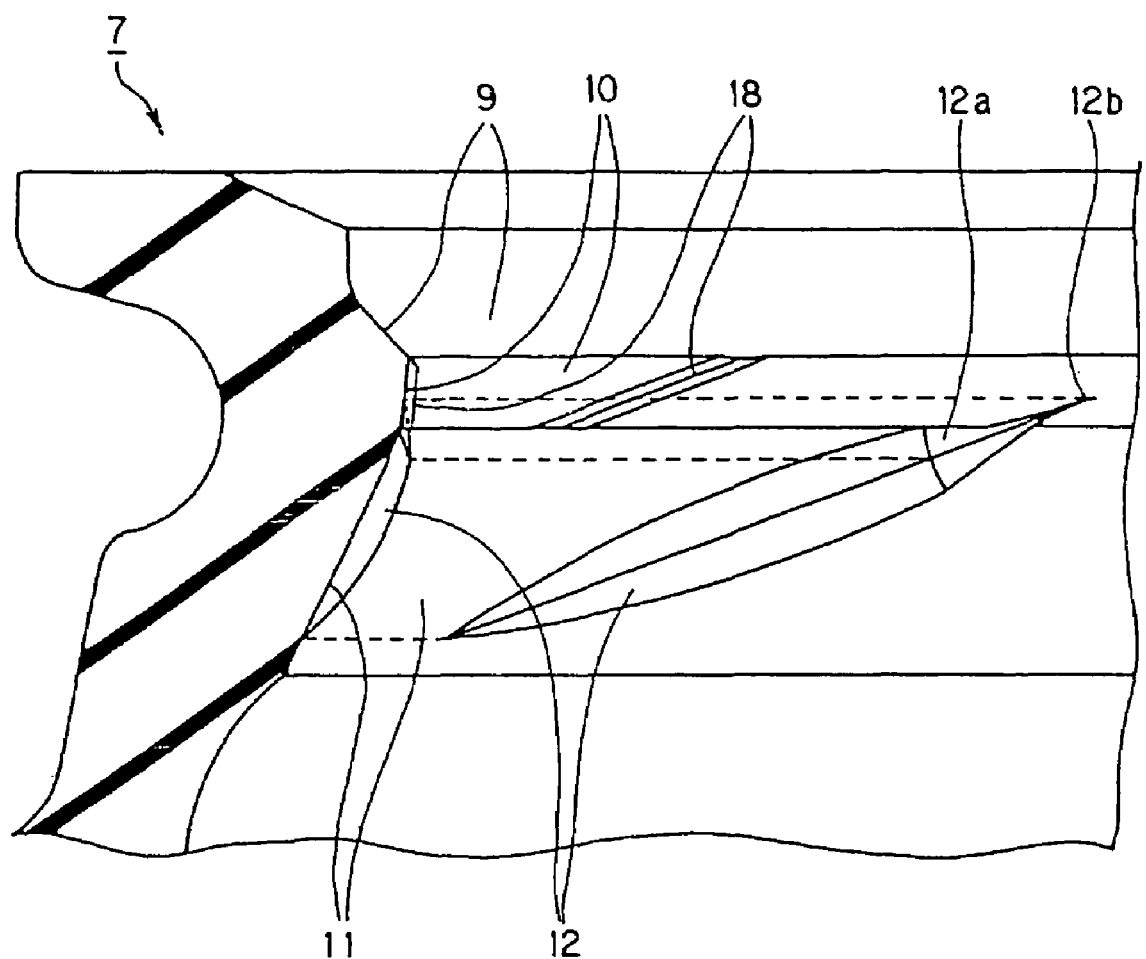
FIG. 5 is a schematic section of a sealing device according to a second embodiment of the invention.

FIG. 5 shows a second embodiment of the invention. The foregoing first embodiment has the construction, in which the screw ridges are formed from the atmospheric side slope to the sliding face. In this embodiment, however, second screw ridges are additionally formed on the sliding face.

The remaining constructions and actions are identical to those of the first embodiment. Hence, the description of the common construction portions will be omitted by designating the portions by the common reference numerals.

The seal lip 7 of this embodiment is provided on its sliding face 10 with parallel screw ridges 18 as the second screw ridges. These parallel screw ridges 18 are formed to extend from the end edge of the sliding face 10 on the atmospheric side A to the end edge on the sealed object side O and to have substantially predetermined sizes in both height and width.

With the parallel screw ridges 18 formed on the sliding face 10, at the initial action time, the sliding face 10, the parallel screw ridges 18 and the cutoff portions 12a of the screw ridges 12 make contacts with the circumference of the shaft 3. Therefore, the screw pump effect by the screw ridges can be enhanced to improve the initial sealing properties better.

In order to form the parallel screw ridges 18 of that shape, it is sufficient to push a cutter having a straight blade edge onto the corresponding portion of the molding die thereby to cut the recesses corresponding to the screw shapes. Therefore, little difficult is encountered when the molding die or the sealing device itself is worked.

Other Embodiments

In the individual embodiments thus far described, there are adopted the bilge-shaped screw ridges, to which the screw ridges should not be limited in shape. However, a variety of screw shapes can be adopted, as exemplified in FIGS. 6A and 6B.

Figure 6A:
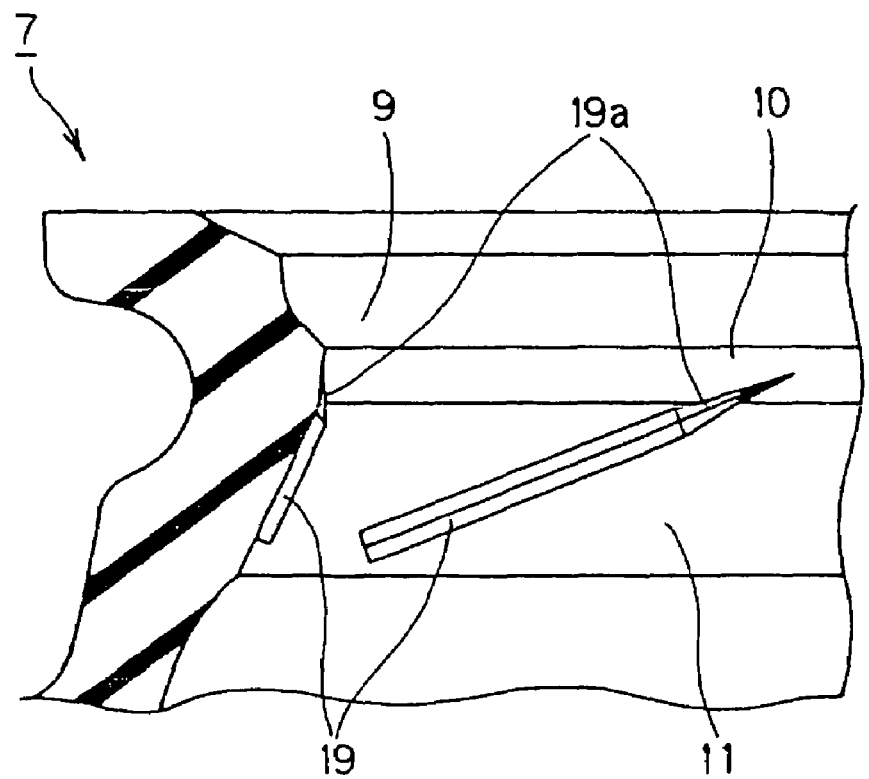
FIGS. 6A and 6B are schematic sections of sealing devices according to other embodiments of the invention.

In FIG. 6A, screw ridges 19 of a parallel screw shape are formed from the atmospheric side slope 11 to the sliding face 10 of the seal lip 7. The screw ridges 19 are based by a parallel screw shape having substantially predetermined sizes in both height and width. In this shape, the end portions (or cutoff portions 19a) on the side of the sliding face 10 are cut off along the circumference of the shaft.

Figure 6B:
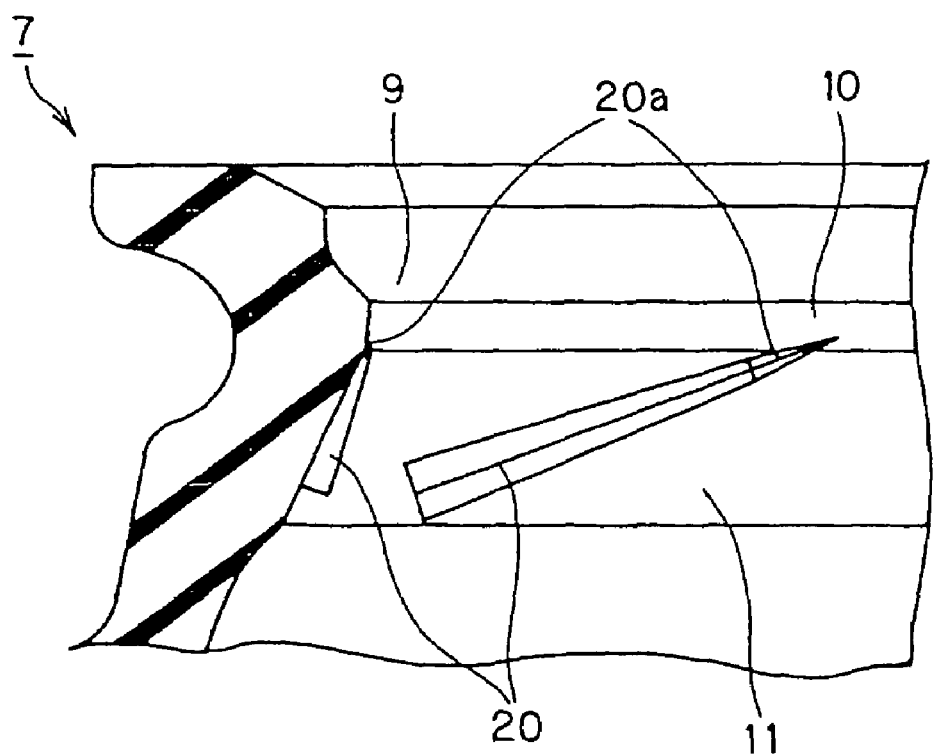
Figure 7:
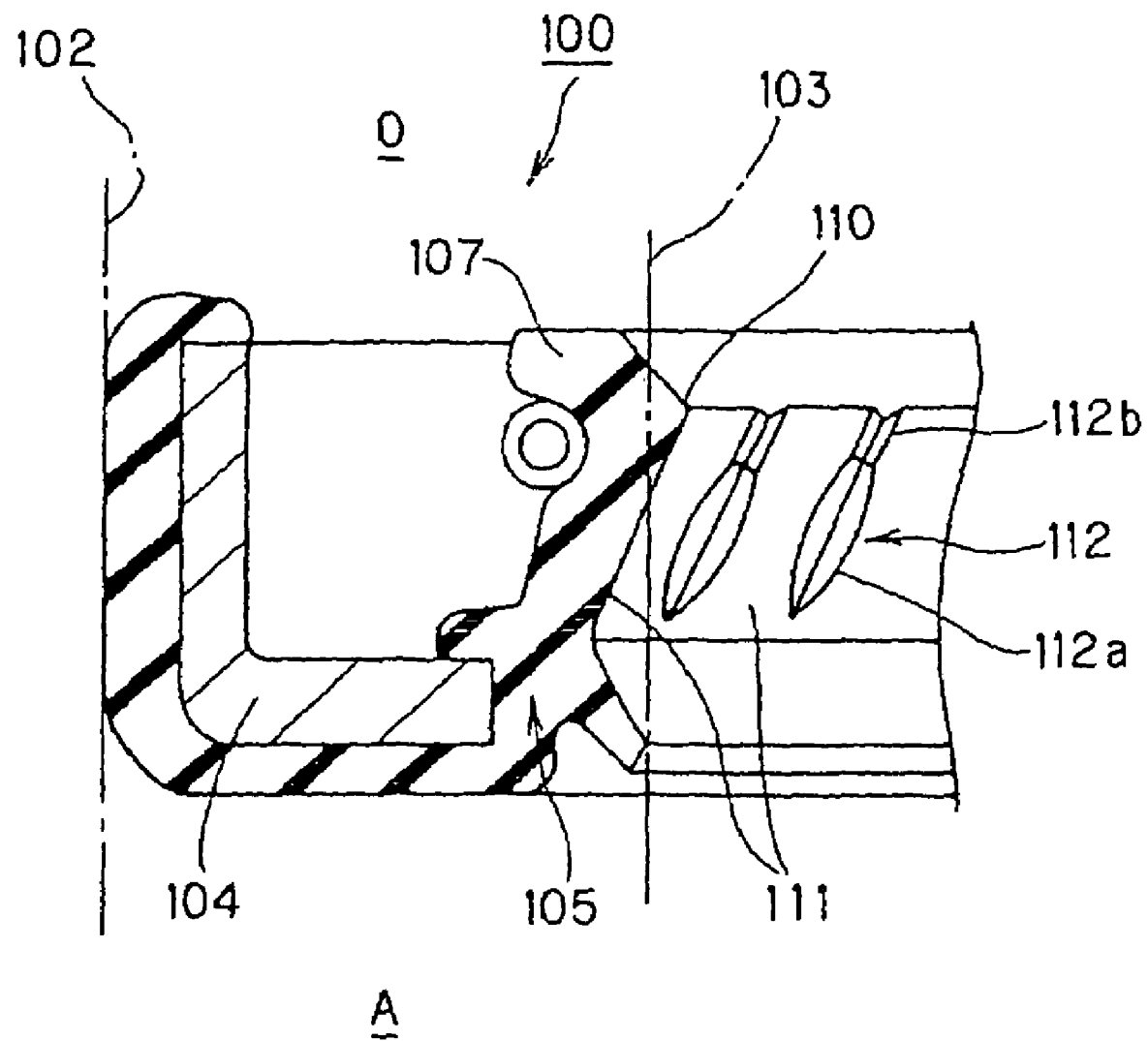
FIG. 7 is a schematic section of a sealing device of the related art.
Figure 8A:
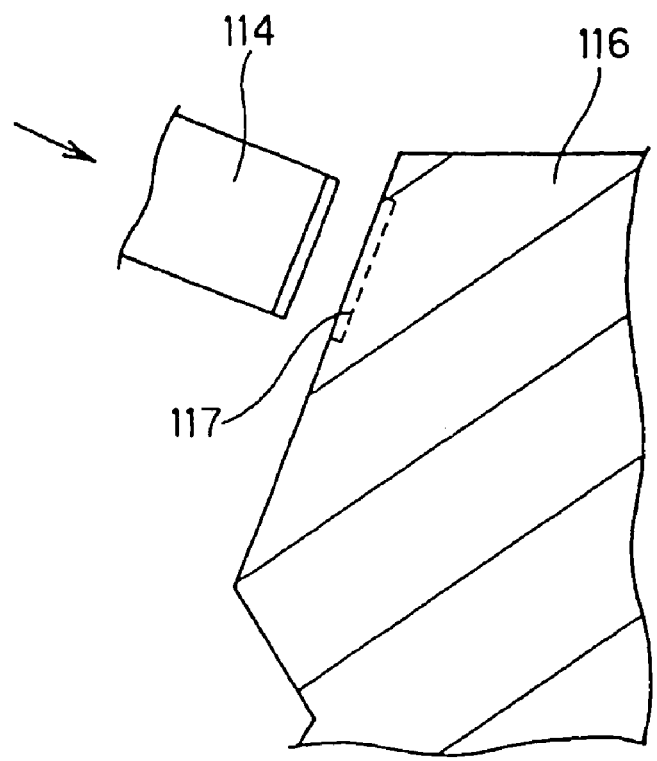
FIGS. 8A and 8B are schematic diagrams showing the behavior, in which a recess corresponding to the screw ridge of the related art is formed in a molding die.
Figure 8B:
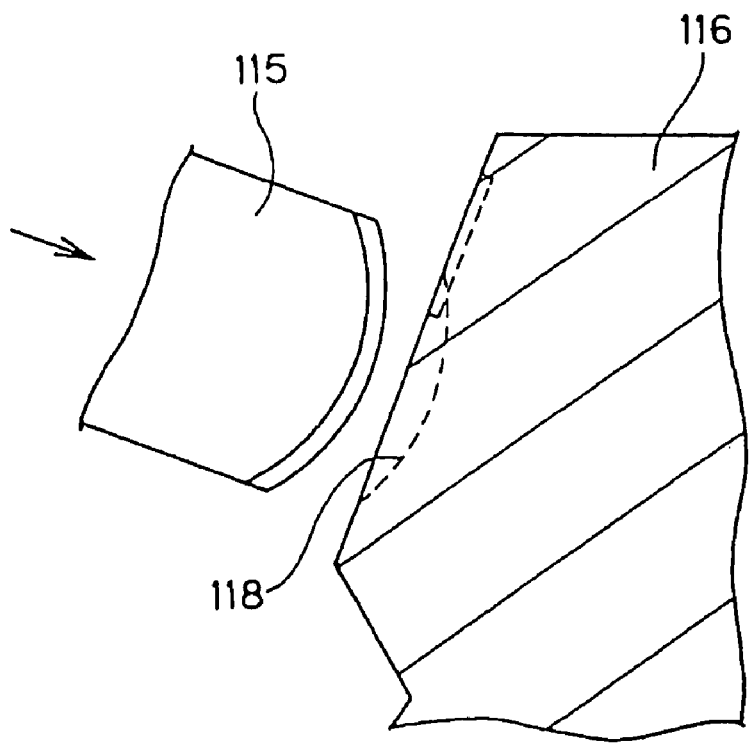

In FIG. 6B, moreover, screw ridges 20 of a taper shape are formed from the atmospheric side slope 11 to the sliding face 10 of the seal lip 7. The screw ridges 20 are based by such a taper shape as is made larger in height and width toward the atmospheric-side. In this shape, the end portions (or cutoff portions 20a) on the side of the sliding face 10 are cut off along the circumference of the shaft.

These cases of the screw ridges 19 and 20 can also attain the actions and effects like those of the foregoing first embodiment.

INDUSTRIAL APPLICABILITY

According to the invention, the sliding portion between the seal lip and the member circumference is made of a face (or a sliding face) so that the facial pressure at the initial action time can be lowered to suppress the proceeding of the wear of the seal lip thereby to elongate the lifetime of the sealing device.

Moreover, both the sliding face and the atmospheric side slope are provided with the screw ridges so that the satisfactory sealing properties can be exhibited initially and endurably for a long time by the screw pump effect of the screw ridges.

Moreover, the internal angle of the joint portions between the screw portions arranged on the atmospheric side slope and the screw portions arranged on the sliding face is made salient so that the step of working the recesses corresponding in the screw ridges in the molding die for the sealing device can be made simple and easy.

If the screw ridges are formed along the atmospheric side slope and to have a cut-off shape at their end portions on the side of the sliding face along the sliding face, the working can be more facilitated. In case the screw ridges are formed to have the straight cut-off shape, moreover, the working by the cutter itself can be facilitated, and the dispersion in the sealing performances due to the working precision can be suppressed to improve the reliability of the sealing device.

If the second screw ridges are formed on the sliding face, moreover, the sealing properties at the initial action time can be better improved.

The invention claimed is:

1. A method for manufacturing a sealing device for sealing an annular clearance between two members assembled to rotate relative to each other, said sealing device including a seal lip for sliding on a circumference of one of said two members, said seal lip having a sliding face extending along said circumference, an atmospheric side slope inclined to enlarge the clearance gradually between the slope and said circumference from an atmospheric side end edge of said sliding face, and a screw ridge formed along said atmospheric side slope and a portion of said screw ridge being arranged on said sliding face being formed to have a shape that two slopes constructing said portion appear to be cut off respectively from end portions on a side of the other portion of said screw ridge arranged on said atmospheric side slope so as to make a tip of said screw ridge of the portion intersect with said sliding surface, said method comprising the steps:

forming a recess in a molding die for forming the sealing device corresponding to a screw shape of the screw ridge of the sealing device by only a single cutting operation of a single cutter, forming said cutter with an arcuate blade edge extending continuously constantly from one side of the cutter to an opposite side of the cutter and removing one end of the arcuate blade edge at the one side of the cutter to disrupt the continuously constant extension of the arcuate blade edge of the single cutter from the one side to the opposite side of the single cutter and thereby forming a cut-off blade edge recessed from the arcuate blade edge, and pouring an elastic material into said molding die, and vulcanizing and shaping the elastic material to obtain the sealing device.

2. Method according to claim 1, wherein an internal angle of a joint between two portions of said screw ridge, one portion arranged on said atmospheric side slope and the other portion being arranged on said sliding face, is a salient angle.

3. Method according to claim 1, wherein a second screw ridge is formed only on said sliding face.

4. Method according to claim 1, wherein a second screw ridge is formed only on said sliding face.

* * * * *

UNITED STATES PATENT AND TRADEMARK OFFICE
CERTIFICATE OF CORRECTION

PATENT NO. : 7,645,412 B2 Page 1 of 1
APPLICATION NO. : 11/711105
DATED : January 12, 2010
INVENTOR(S) : Furuyama It is certified that error appears in the above-identified patent and that said Letters Patent is hereby corrected as shown below:

Title Page, Item (73) Assignee: should read
--(73) Assignee NOK Corporation, Tokyo (JP)--

Signed and Sealed this

Seventeenth Day of August, 2010

David J. Kappos
*Director of the United States Patent and Trademark Office*